United States Patent Office 2,738,174
Patented Mar. 13, 1956

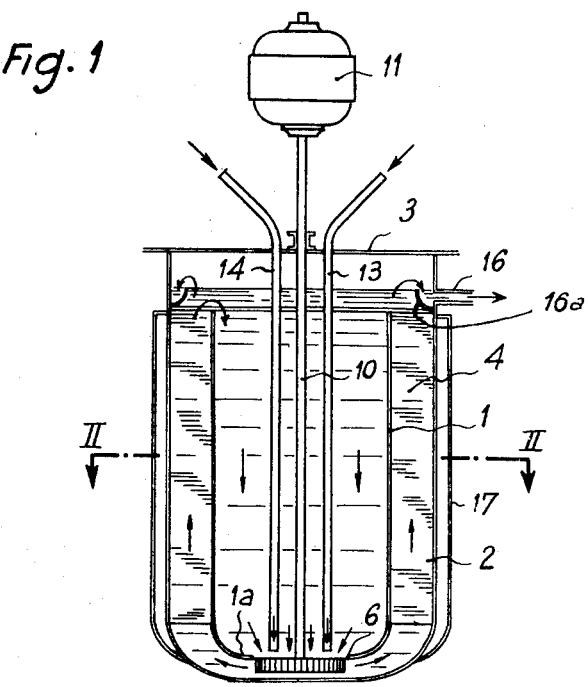
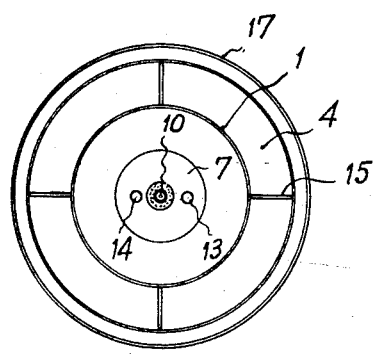
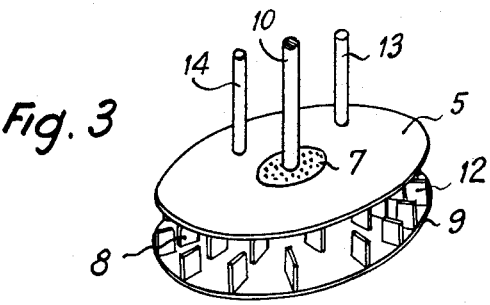

2,738,174

REACTION APPARATUS FOR CONTINUOUS OPERATION

Dominique Magnant, Douai, Joseph Carabasse, Noeux-les-Mines, Bernard Godeau, Douai, and André Mennessier, Bethune, France, assignors to Houillères du Bassin du Nord et du Pas-de-Calais, Douai, France, a French public establishment Application January 21, 1953, Serial No. 332,262

Claims priority, application France February 8, 1952

7 Claims. (Cl. 259—96)

This invention relates to a reaction apparatus for continuous operation. There exists numerous models of reaction apparatus, constituted under the form of mixers, turbo-reactors, crushing-mills, pumps, etc., by which two liquids are put in presence of each other, or a liquid and a powdered solid, or a solid in the colloidal state, in order to achieve a refining, extracting or emulsioning effect, these apparatus ensure that the two products will be brought in contact by simultaneous subdivision through narrow passages, by turbulence, by injection of air or inert gases, by injection atomising one of the products in the midst of the medium, by various vibrating arrangements, etc. . . .

These various apparatus can generally be used only discontinuously with the drawbacks attaching to this kind of work: unsatisfactory output and a too great share left to the initiative of the operative in what concerns the conditions under which the reaction takes place, particularly the duration and the temperature.

As a matter of fact, a continuous reaction apparatus requires for obtaining a product of constant composition with a minimum of waste the strict and automatic control of the time and of the conditions of contact of the two products and also of the reaction temperature, the swift evacuation of the reagents after the reaction, and, sometimes, a rapid treatment of the spent reagents with a view to their utilisation for manufacture of secondary importance.

Now, these conditions which are necessary, when it is desired to achieve a continuous sequence of reactions (such as alternate washing of hydrocarbides with soda, acid, water and soda), are never satisfied with the known apparatus. These, in fact, convey the drawback that a portion of the bodies which must react upon each other short-circuit the apparatus so that when one employs them, for example for refining, the final refined products always contain a portion of the impurities of the product to be refined, even when large excesses of reagents are used. Moreover, the known apparatus, even when they are very regularly fed from the beginning, give birth to pulsations in the output which it is difficult to damp down.

This invention has for its object a reaction apparatus of a particular type ensuring a contact between several products, the rate of intimacy and the duration of which will be exactly determined, and, consequently, adapted to ensure complete continuous reactions (for example of purification) by means of a suitable grouping of several apparatus with, eventually, the insertion of decanters in the circuit.

This reaction apparatus is designed in the usual manner under the form of a cylindrical vat at the bottom of which a member is provided to force back the mixture into an annular space communicating with the body of the vat at the upper portion of the latter. It is notably characterized in that the introduction of the products which must react and the discharge of the products having reacted are so arranged that no product that must react can pass through the exhaust without having reacted. Moreover, the member for forcing back the mixture also serves as a stirrer so as to force back into the annular space a perfectly homogeneous mixture of reagents very finely divided; the whole of the reaction apparatus is so arranged as to maintain such a homogeneity while avoiding decantations due to whirlings or centrifugal motions and any local increase of the circulation speed out of the stirrer.

The appended diagrammatic drawing, by an example of the manner of carrying out the invention, enables the invention to be better understood.

Fig. 1 is a vertical section of the apparatus.
Fig. 2 is a horizontal section along II—II of Fig. 1.
Fig. 3 is a perspective view of the stirrer selected as an example.

The reaction apparatus represented is constituted by a cylindrical vat 1 terminated at its lower portion by a convex bottom 1a and surrounded by a second vat 2 of corresponding shape, but extending above the first and closed by a tight lid 3.

In the bottom of the vat 1 is disposed a stirrer by the intermediary of which the communication between this vat 1 and the annular space 4, provided between the vats 1 and 2, takes place. This stirrer is of any model and must be designed simply for the purpose of transmitting in the space 4 a mixture, rendered homogeneous, of the two products or more, introduced in the vat 1. In the example shown, this stirrer is constituted by a disc 5 placed edge to edge with the edges 6 of the convex bottom 1a and perforated axially at 7 for the introduction of the liquid products to be rendered homogeneous. This disc 5 is provided on its lower portion with a series of stirring members constituted by partitions, blades or the like 8, distributed on the whole of its surface and principally on its periphery. Underneath of the disc 5 is disposed a second disc 9, the dimensions of which are practically analogous to those of the disc 5, rotatively driven from the outside of the vat by a shaft 10 clutched to a motor 11 or to any suitable power transmission device.

The disc 9 is provided with a series of stirring members or blades 12, disposed so as to pass freely between the stirring members 8 of the fixed disc 5. It is clearly seen on the drawing that the liquids penetrating axially by the orifices 7 shall be mixed during their passage between the discs 5 and 9 so as to issue radially in the form of a mixture rendered partly homogeneous.

In order to avoid any risk of passage of a portion of the products that has not yet reacted through the exhaust, the products that must react are introduced through vertical tubes 13 and 14 extending through the tight lid 3 and axially all over the height of the vat so as to open directly over the disc 5. The discharge of the products that have reacted takes place, on the other hand, through an overflow 16 after passing on a horizontal gutter 16a the upper edge of which is provided over the level of the partition 1 between the principal chamber and the annular space 4. Moreover, in order to prevent the products that have not yet reacted, though they have passed through the stirrer, from being discharged at 16, that is to say, to ensure a certain recycling until complete reaction, the stirring-pump 5 is driven at a speed such that the downward speed in the central compartment be higher than the upward speed of the lightest reagent under the effect of its difference of density.

The annular space 4, moreover, is divided, at least in its cylindrical part, by shutters or partitions 15, in a plurality of sectors, compelling these fluids to move vertically, that is preventing any gyratory motion of the liquids circulating therein and any centrifugal action which could affect adversely the homogeneity of the mixture.

The reaction apparatus is provided also with a double jacket 17 in which a refrigerating or heating liquid may be caused to circulate, according as the reaction is exothermic or endothermic, in order to ensure that the reaction takes place at a constant temperature.

The length of time during which the reagents remain in the apparatus being determined with precision by the ratio between the capacity of the vat 2 and the feed supply of the tubes 13 and 14, the number of recyclings to which the mixture is subjected, that is to say, the average number of times that it traverses the stirrer before being evacuated, is determined by the speed of rotation of the latter.

In other words, the apparatus according to the invention allows to regulate with precision all the variables influencing the speed of the reaction, including the temperature; it is therefore, as indicated at the beginning, suitable for a continuous treatment with a better output.

What we claim is:

1. A reaction apparatus for ensuring contact between several reagents fed thereto; said apparatus comprising an upstanding outer compartment, an upstanding inner compartment concentrically disposed within said outer compartment and spaced from the latter to define a space of uniform cross-section therebetween, said space between the inner and outer compartments opening into the interior of said inner compartment adjacent the top of the latter, a plurality of pipes each carrying a related one of the reagents to be fed to the apparatus and opening downwardly into said inner compartment adjacent the bottom of the latter, pumping and agitating means at the bottom of said inner compartment to receive the reagents fed separately to the apparatus immediately upon the discharge of the reagents from the respective pipes and operative to intimately mix and to circulate the reagents from the inner compartment upwardly through said space between the compartments, and means defining an overflow discharge from said space at a level above that at which said space opens into the interior of said inner compartment.

2. A reaction apparatus according to claim 1; wherein said pumping and agitating means is effective to produce a downward circulation of the reagents within said inner compartment at a speed exceeding that at which the lightest of the several reagents introduced into the apparatus rises by reason of the differences between the densities of the several reagents.

3. A reaction apparatus according to claim 1; wherein said pumping and agitating means includes a radial impeller and fixed blades cooperating with the impeller to stir the several reagents for ensuring the homogeneity of the mixture of said reagents.

4. A reaction apparatus according to claim 1; wherein the cross-sectional area of said inner compartment is equal to the uniform cross-sectional area of said space to avoid any local acceleration of the reagents circulated by said pump means which would be detrimental to the homogeneity of the mixture of said reagents.

5. A reaction apparatus according to claim 1; further comprising radial partitions between said inner and outer compartments along the entire length of said space and dividing the latter into a plurality of segregated sectors which deter gyratory motion of the reagents during circulation through said space and thereby prevent centrifugal separation of the reagents.

6. A reaction apparatus for ensuring intimate and controllable contact between several reagents fed thereto; said apparatus comprising an upstanding, cylindrical outer compartment closed at the top and bottom ends thereof, an upstanding, cylindrical inner compartment disposed concentrically within said outer compartment and spaced from the latter to define an annular space of uniform cross-section there-between, said inner compartment being open at the top to communicate with said annular space adjacent the top of the latter, pipes for separately supplying the several reagents to the apparatus extending into said inner compartment and opening adjacent the bottom of the latter, means defining the bottom of said inner compartment having a series of openings therein, a radial impeller rotatably disposed below said openings to draw the reagents through the latter and to cause the reagents to travel radially outward below said inner compartment and then upwardly through said annular space, fixed blades depending from the bottom of said inner compartment to cooperate with said impeller in effecting intimate mixing of the reagents, means for driving said impeller, an annular channel at the top of said annular space above the upper edge of said inner compartment to define an overflow for receiving the reacted products and means defining a discharge from said channel for removing the reacted products from the apparatus.

7. A reaction apparatus according to claim 6; wherein said inner compartment has a uniform cross-sectional area along substantially the entire length thereof which is equal to the uniform cross-sectional area of said annular space to avoid localized accelerations of the reagents during the circulation of the latter by said impeller; and further comprising spaced apart radial partitions between said inner and outer compartments and extending along substantially the entire length of said annular space to prevent gyratory motion of the reagents during upward circulation through said space and thereby to avoid centrifugal separation of the reagents.

References Cited in the file of this patent

UNITED STATES PATENTS

| | | |
|---|---|---|
| 400,807 | Toepfer | Apr. 2, 1889 |
| 1,080,177 | Still | Dec. 2, 1913 |
| 1,768,957 | Johnson | July 1, 1930 |
| 1,953,022 | McCombe | Mar. 27, 1934 |
| 1,982,002 | Hatch | Nov. 27, 1934 |
| 2,042,818 | Allen et al. | June 2, 1936 |
| 2,114,547 | Sollinger | Apr. 19, 1938 |
| 2,482,908 | Hatch et al. | Sept. 27, 1949 |